July 28, 1925.

N. FURFARO ET AL

ELECTRIC HEATER

Filed Jan. 31, 1924

1,547,647

2 Sheets-Sheet 2

INVENTORS
Nicola Furfaro
Robert L. Rockwell
BY
Fred B. Matheny
ATTORNEY

Patented July 28, 1925.

1,547,647

UNITED STATES PATENT OFFICE.

NICOLA FURFARO AND ROBERT L. ROCKWELL, OF SEATTLE, WASHINGTON.

ELECTRIC HEATER.

Application filed January 31, 1924. Serial No. 689,642.

*To all whom it may concern:*

Be it known that we, NICOLA FURFARO and ROBERT L. ROCKWELL, citizens of the United States, residing at Seattle, in the county of King and State of Washington, have invented a certain new and useful Improvement in Electric Heaters, of which the following is a specification.

This invention relates to improvements in electric heaters of the type wherein an electric heating element is disposed in close proximity to a concave heat reflector by which the heat from the heating element is reflected outwardly and an object of this improvement is to provide an electric heater of this type having a secondary conical reflector or deflector by which the heat may be deflected sidewise and distributed evenly on all sides of the electric heater, the said secondary reflector being removable.

Another object of the invention is to provide an electric heater of this nature having a circular or ring type heating element and having beneath said heating element a concave reflector of double elliptical cross section placed so that each element of the heating unit has its center at one of the focal points of the reflector and to provide a reflector of conical cross sectional shape located so that the focal point of any section of the conical reflector is common to the second focal point of the corresponding section of the elliptical reflector.

A further object is to provide an electric heater of the reflector type having a heating element and a reflector constructed and arranged so that the reflected heat will be reflected convergently to a common focus in front of the heater and will then diverge and warm a relatively wide area instead of being projected outwardly in a beam as is common to heaters of this type.

With the above and other objects in view as will be apparent from the following description the invention consists in the novel construction, adaptation and combination of parts of an electrical heater as will be more clearly hereinafter described and claimed.

Figure 1:
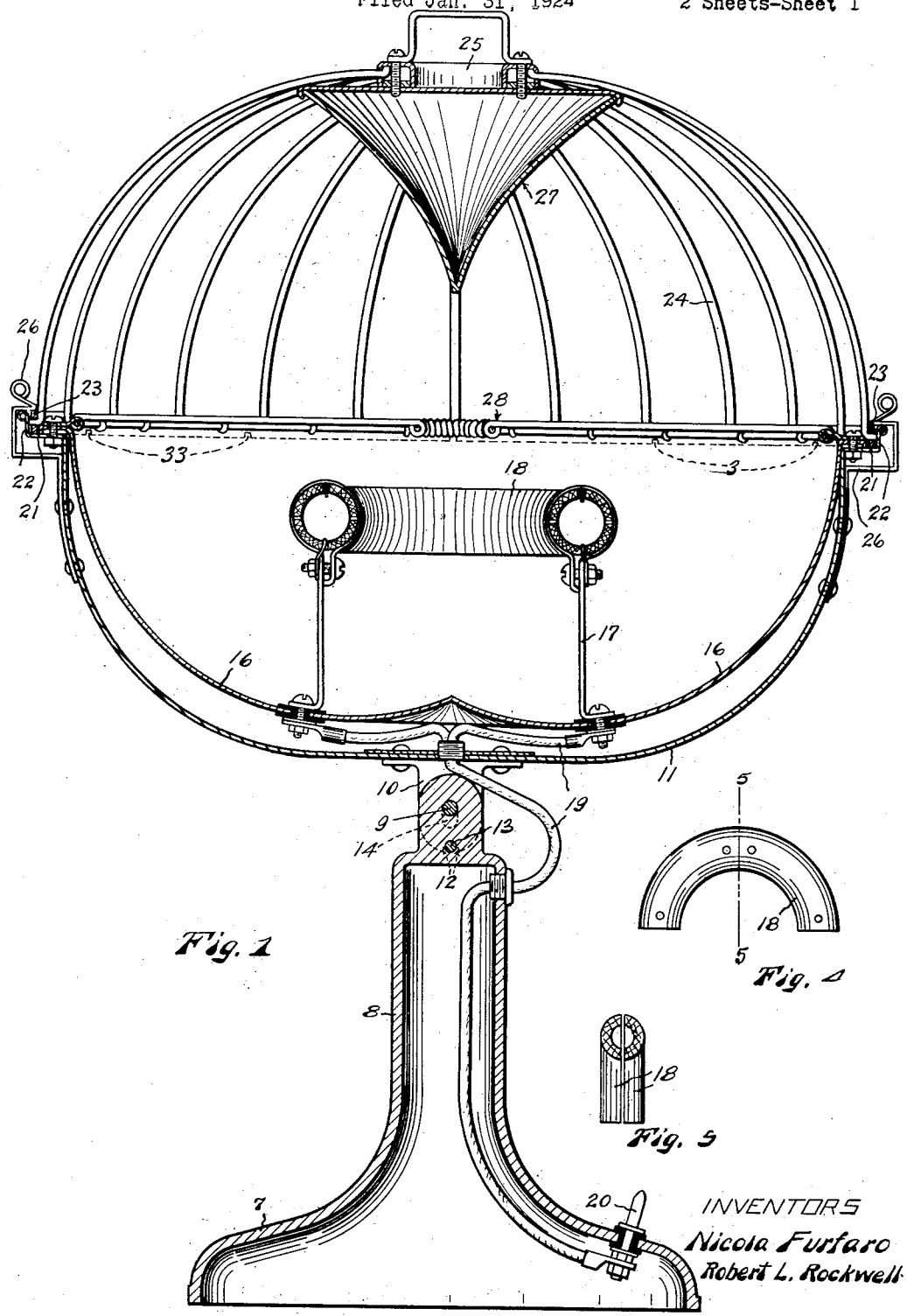
Figure 2:
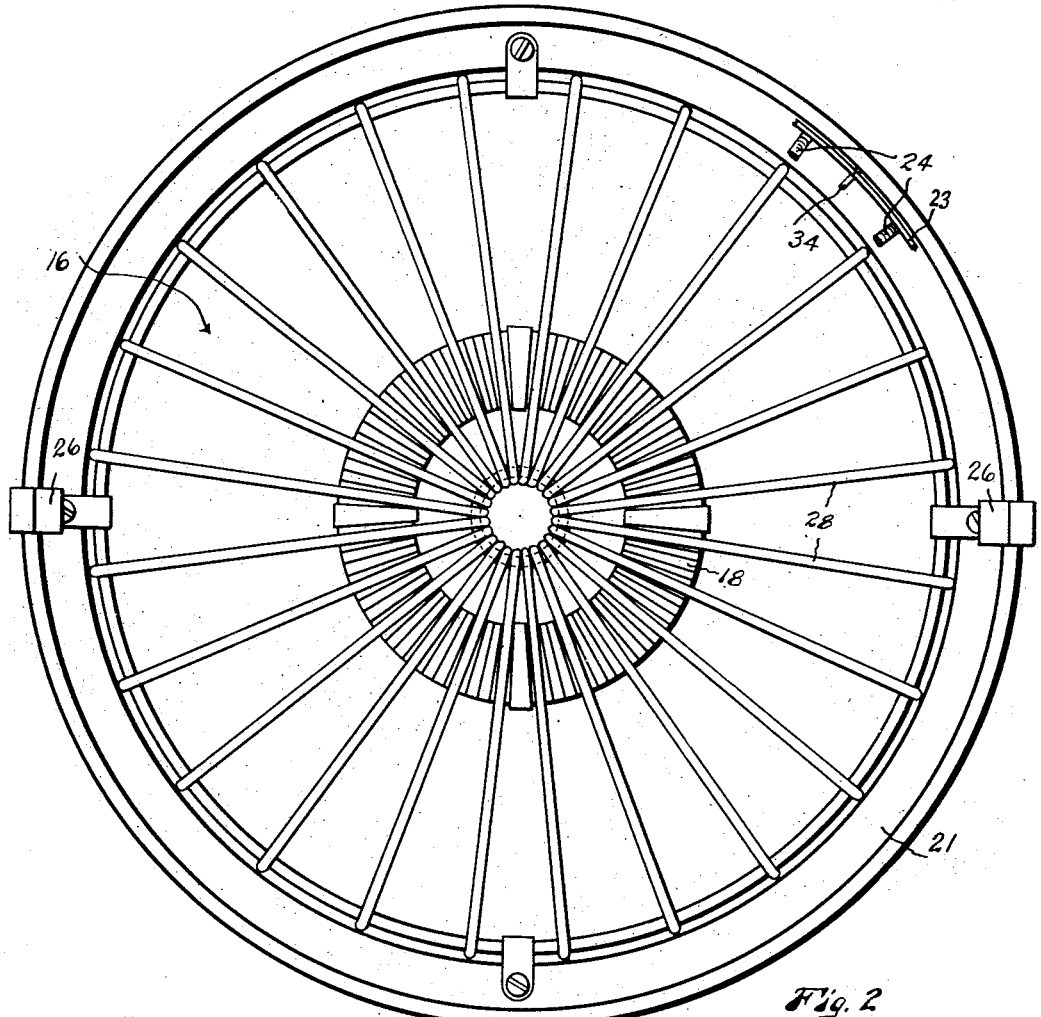
Figure 3:
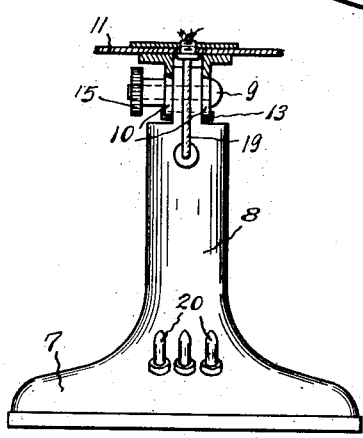
Figure 6:
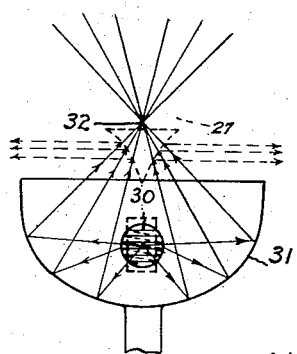

In the accompanying drawings Figure 1 is a view in vertical mid-section of an electric heater constructed in accordance with this invention, parts being shown in elevation; Fig. 2 is a plan view of the same showing the outer wire guard and heat deflector member removed; Fig. 3 is a view in elevation on a reduced scale of the base portion of the heater showing a fragment of the heater bowl in cross section; Fig. 4 is a detached plan view of one half of the circular heating element core; Fig. 5 is a sectional view on broken line 5—5 of Fig. 4 and Fig. 6 is a diagrammatic view of a modification of the invention.

Like reference numerals designate like parts throughout the several views.

The drawings show an electric heater comprising a base 7 having a centrally arranged standard 8 that is connected at its upper end by a pivot bolt 9 with brackets 10 that are secured to the center of a concave circular housing member 11.

The brackets 10 are preferably provided on their bottom edge with notches 12 that fit over pins 13 in the standard 8 and such brackets are provided with slots 14 through which the pivot bolt 9 passes, the pins 13 serving to hold bowl 10 in the position shown in Fig. 1 when they are within the notches 12 and the slots 14 making it possible to withdraw the brackets 10 from engagement with the pins 13 by loosening a thumb nut 15 on the pivot bolt 9 so that the bowl 10 may be inclined at any desired angle instead of being held in the horizontal position as shown.

Disposed within the bowl 11 and spaced therefrom is a concave heat reflector 16 of double elliptical section that is curved upwardly toward the center and that serves as a support for upwardly protruding posts 17 upon which are mounted a circular electric heating element 18. The element 18 is preferably formed of separable upper and lower halves as more clearly shown in Figs. 4 and 5.

The supporting posts 17 are insulated from the reflector 16 and are connected with electric circuit wires 19 that may extend dowwnardly through the hollow standard 8 and be connected with terminal members 20.

The outer bowl or housing 11 terminates in an annular shelf 21, having an upwardly projecting circumferential flange 22, provided with a rolled extremity. The upper edge of the reflector 16 extends over and rests upon the shelf 21, and is spaced from the flange 22 to provide an annular recess, for the reception of a ring 23, to which are secured curved guard wires 24 that extend upwardly and inwardly toward a common center and from a guard member or grating of a type common to this class of heaters.

The upper ends of the guard wires 24 are secured to a centrally arranged ring 25 of channel shaped cross section. Spring clips 26 are secured to the bowl 11 at a plurality of intervals and are arranged to hook over the upper edge of the bowl 11 and ring 23 to detachably secure the guard member 24 to such bowl.

The guard member formed by wires 24 serves as a support for a heat reflector 27, preferably of double parabolic sectional shape with its point directed downwardly and arranged co-axially of the reflector 16, the parabolic reflector being positioned so that the focal point of any section of the same is at the second focal point of the corresponding section of the elliptical reflector whereby reflected heat rays from the concave reflector 16 will converge at said common focal point, thence diverge until they are incident on the conical reflector 27 and will thence be reflected outwardly in a direction at substantially right angles to the axis of reflector 27, that is sidewise from the heater and in evenly distributed relation around the entire circumference of the heater, thus directing the heat outwardly over the floor of a room on which the heater rests and warming the room more evenly than would be possible without the deflector 27.

A secondary guard member 28 is arranged to extend across the outer or open end of the reflector bowl 16 to prevent contact of persons or objects with the heating element 18 when the upper guard member formed by wires 24 is removed.

The wires of guard member 24 are spaced to correspond with the wires of secondary guard member 28 and guard member 24, when in use, is positioned so that its wires are directly above, or are in the same radial planes as the wires of guard member 28, thereby reducing to a minimum the interference offered by the guard wires to the free passage of heat. Means are provided for preventing the upper guard member from being applied to the heater in any position except with the guard wires in the correct position in line with the guard wires of the secondary guard member 28. This may be done by providing notches 33 at proper intervals in the bottom of ring 31, see dotted lines Fig. 1 and by providing elements 34, Fig. 2 on the shelf 21 arranged to fit within said notches. The efficiency of the heater is materially increased by providing for the above described arrangement of the guard wires of the two guards.

Figure 6 shows diagrammatically, a modification of the invention in which is provided a ball or cylinder type of heating element 30 supported within a concave elliptical bowl 31, the shape of the bowl 31 and position of the heating element 30 being such as to cause heat from the element 30 to be reflected by the bowl 31 convergently through a common focal point 32 and to thence diverge and be distributed over a relatively wide area. A conical reflector 27 indicated by dotted lines may be disposed at the proper location to intercept the heat before it reaches the focal point 32 and direct the same sidewise at substantially right angles to the axis of the bowl 31, as shown by the dotted lines.

When the heater is used as a distributing heater the guard member 24 will preferably be in the position shown in Fig. 1 thereby causing the heat that is liberated from the element 18 to be directed outward evenly on all sides in substantially horizontal directions.

By removing the guard 24 and upper conical reflector 27 of the device shown in Figs. 1 to 5, the heater is converted into a spot or flood type simple reflector heater. The extent of the spot heating effect is determined by the proximity of the heater to the heated surface. At a position corresponding to the second annular focus of the double elliptical reflector the concentration of the rays makes the heating effect very intense. The rays crossing at this location diverge, and, as the heated surface is placed farther away from the heater, the area over which the heat is distributed is increased, the heat being projected outwardly in substantially the form of a cone. With the guard and upper reflector 27 thus removed, and by tilting the main reflector, it is possible, to distribute the heat from a point on the floor at a person's feet over the body and including the head when the person is only a few feet distant from the heater. By increasing the distance to the heater in this position it is possible to distribute the heat over several persons who may be grouped together.

The double elliptic section of the reflector 16, the double parabolic section of the reflector 27 and the relative locations of the same, co-axially, and with the focal circle of the reflector 27 common to the second focal circle of the reflector 16 are important features of the invention and mutually contribute to produce a heater that will distribute the heat evenly in a horizontal plane, the reflector 27 intercepting practically all of the reflected heat and directing the same outwardly so that it is possible, for instance, to safely set the heater under a table to warm a group of persons around the table.

The heater disclosed in Figure 6 will operate in substantially the same manner as the previously described heater except that the reflected heat will be converged toward a common focal point instead of toward an annular focal circle.

From the foregoing description taken in connection with the accompanying drawings.

the plan of construction and method of operation of this heater will be readily apparent but, while we have disclosed what we now consider to be the preferred embodiment of the invention it will be understood that the device shown is merely illustrative and that such changes therein may be made as are within the scope of the following claims.

What we claim is:

1. An electric heater embodying a concave heat reflector, a heating element disposed therein and a conical heat reflector supported on the exterior of said concave heat reflector in axial alignment therewith.

2. In a heater of the class described, a heating element, a concave reflector designed to reflect heat convergently from said heating element through a common focal point outside said reflector, and a conical heat reflector arranged in the path of the reflected heat from said heating element for the purpose of distributing the heat in substantially a horizontal direction.

3. An electric heater including a concave heat reflector, of double elliptical section, a heating element disposed therein, and an inverted conical heat reflector supported outside of said concave heat reflector in substantially axial alignment therewith.

4. An electrical heater embodying a concave heat reflector, a heating element disposed therein and a heat reflector of inverted conical double parabolic sectional shape supported outside of said concave heat reflector for reflecting heat sidewise at substantially right angles to the axis of said reflector.

5. An electric heater including a concave reflector of double elliptical section, a heating element disposed therein, and an inverted conical heat reflector of double parabolic section supported outside of said heat reflector in substantially axial alignment therewith, said parabolic reflector having its focal circle at the location of the second focal circle of said elliptical reflector.

6. In a heater, a ring type heating element, a heat reflector of double elliptical shape, co-axial with said heating element and having one focal circle located on the center circle of said heating element, and a co-axial heat reflector of double parabolic section having its focal circle common to the second focal circle of said elliptical reflector.

7. In a device of the class described, a concave heat reflector having an upwardly protruding central portion forming an axial point, and a circular heating element supported co-axially of said heat reflector for the purpose of causing heat from said heating element to be reflected convergently through a common focus and thence to diverge.

8. In an electric heater of the class described, a ring type heating element, a heat reflector of double elliptical axial section arranged co-axially with said heating element, with the center circle of said heating element at the focal circle of said reflector for the purpose of causing heat from said heating element to be reflected convergently through a second focal circle of the reflector and thence to diverge.

9. In a heater of the class described, the combination with a concave reflector having a heating element therein of two open work guard members arranged at the open end of said reflector with their elements in substantial alignment to thereby afford a minimum interference to the outward flow of heat.

10. A device of the class described embodying a concave heat reflector, a heating element disposed therein, an open work guard supported above said heating element in a plane perpendicular to the axis of said concave heat reflector, a concavo-convex open work guard supported above said first named guard, the elements of said two guards being arranged in alignment to afford a minimum interference to the passage of heat and a conical heat reflector supported by said last named guard.

NICOLA FURFARO.
ROBERT L. ROCKWELL.